United States Patent
Cahan et al.

(10) Patent No.: US 10,002,533 B2
(45) Date of Patent: Jun. 19, 2018

(54) SYSTEM, METHOD AND RECORDING MEDIUM FOR EMERGENCY VEHICLE ROUTE GUIDANCE

(71) Applicant: International Business Machines Corporation, Armonk, NY (US)

(72) Inventors: Amos Cahan, Dobbs Ferry, NY (US); Ruchi Mahindru, Elmsford, NY (US); Valentina Salapura, Chappaqua, NY (US); Syed Yousaf Shah, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/196,142

(22) Filed: Jun. 29, 2016

(65) Prior Publication Data
US 2018/0005523 A1 Jan. 4, 2018

(51) Int. Cl.
| G08G 1/0968 | (2006.01) |
| G08G 1/0965 | (2006.01) |
| G08G 1/0967 | (2006.01) |
| G01C 21/34 | (2006.01) |
| G01C 21/36 | (2006.01) |
| G08G 1/095 | (2006.01) |

(52) U.S. Cl.
CPC ....... *G08G 1/0965* (2013.01); *G01C 21/3415* (2013.01); *G01C 21/3691* (2013.01); *G08G 1/095* (2013.01); *G08G 1/0968* (2013.01); *G08G 1/096791* (2013.01)

(58) Field of Classification Search
CPC ................. G08G 1/0965; G08G 1/095; G08G 1/096791; G01C 21/3415; G01C 21/3691
USPC ......................................................... 340/902
See application file for complete search history.

(56) References Cited

U.S. PATENT DOCUMENTS

| 2006/0184319 A1* | 8/2006 | Seick | G01C 21/28 701/533 |
| 2007/0159354 A1* | 7/2007 | Rosenberg | G08G 1/0965 340/902 |
| 2012/0259537 A1* | 10/2012 | Schmidt | A01B 69/00 701/300 |

\* cited by examiner

*Primary Examiner* — Steven Lim
*Assistant Examiner* — Mancil Littlejohn, Jr.
(74) *Attorney, Agent, or Firm* — Yeen C. Tham, Esq.; McGinn IP Law Group, PLLC

(57) ABSTRACT

An emergency vehicle route management method, system, and non-transitory computer readable medium, include analyzing a map to plot roads, a user including user data, and an emergency vehicle including emergency vehicle data on the map, determining an intersection of the roads within a predetermined radius of the emergency vehicle, and delivering an action for the user based on a road on a path of the emergency vehicle being determined by the determining to intersect with a road of the user.

18 Claims, 8 Drawing Sheets

SYSTEM, METHOD AND RECORDING MEDIUM FOR EMERGENCY VEHICLE ROUTE GUIDANCE

BACKGROUND

The present invention relates generally to an emergency vehicle route management method, and more particularly, but not by way of limitation, to a system, method, and recording medium for communication between emergency vehicles and other road users, as well as traffic control systems to optimize a time for an emergency vehicle to arrive at a destination.

Emergency vehicles need to get to their destination within a very short time to provide assistance at the emergency. Any traffic and congestion can add delays that can lead to catastrophic results. At times, such as in the case of a road accident, emergency vehicles have to communicate the presence of danger and directions to road users.

Conventional emergency route management techniques use sirens and flashing lights to warn other road users and often loudspeakers to communicate specific instructions. However, the conventional techniques are limited in that they can be used only in a short distance. Also, it is often difficult to trace the location and direction of an emergency vehicle based on the sound of their sirens. This can result in confusion and anxiety in other road users. It can also lead to delayed actions of other road users aimed at clearing the path for an approaching emergency vehicle, slowing down the emergency vehicle and delaying its arrival to its destination. Thus, the technical problems with the conventional techniques have created a long-felt need in the art for an improved emergency vehicle route management technique.

SUMMARY

Thus, the inventors have realized a technical solution to the technical problem to provide significantly more than the conventional technique of emergency vehicle route management via the technical solution in which a method can provide clear route paths for an emergency vehicle by notifying other road users or traffic signals of the approach of the emergency vehicle and providing directions how to act based on the projected path of the emergency vehicle.

In an exemplary embodiment, the present invention can provide an emergency vehicle route management method, the method including analyzing a map to plot roads, a user including user data, and an emergency vehicle including emergency vehicle data on the map, determining an intersection of the roads within a predetermined radius of the emergency vehicle, and delivering an action for the user based on a road on a path of the emergency vehicle being determined by the determining to intersect with a road of the user.

Further, in another exemplary embodiment, the present invention can provide an emergency vehicle route management method, the method including delivering emergency vehicle data of an emergency vehicle to a user device, performing on the user device: analyzing a map to plot roads and a user including user data on the map, determining an intersection of a road on a path of the user with a path of the emergency vehicle, and determining an action for the user to avoid interfering with the path of the emergency vehicle.

Even further, in another exemplary embodiment, the present invention can provide an emergency vehicle route management system, said system including a processor, and a memory, the memory storing instructions to cause the processor to: analyzing a map to plot roads, a user including user data, and an emergency vehicle including emergency vehicle data on the map, determining an intersection of the roads within a predetermined radius of the emergency vehicle, and delivering an action for the user based on a road on a path of the emergency vehicle being determined by the determining to intersect with a road of the user.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
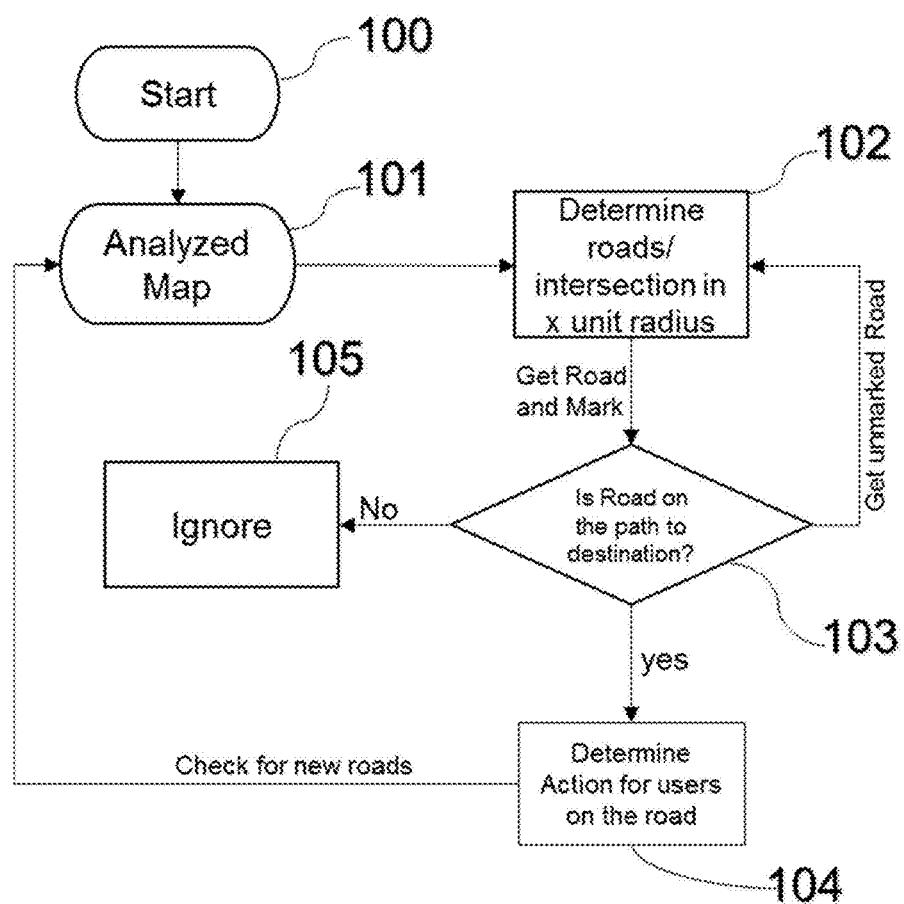
FIG. 1 exemplarily shows a high level flow chart for an emergency vehicle route management method 100.
Figure 2:
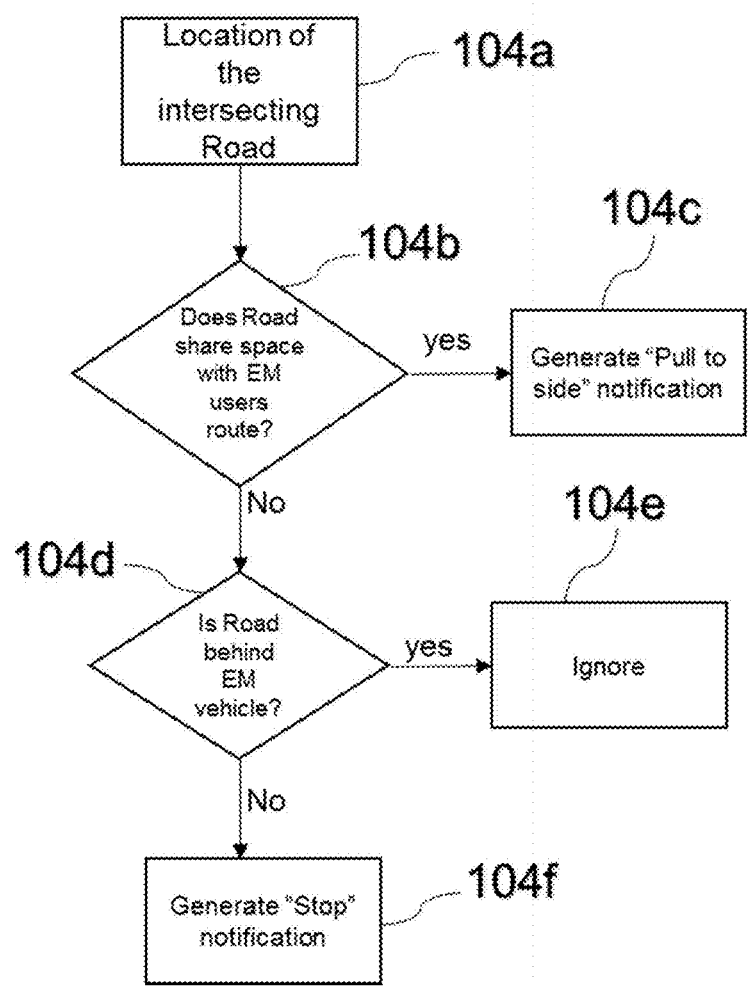
FIG. 2 exemplarily shows a high level flow chart for at least Step 104 of the emergency vehicle route management method 100.

The invention will now be described with reference to FIGS. 1-8, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Figure 4:
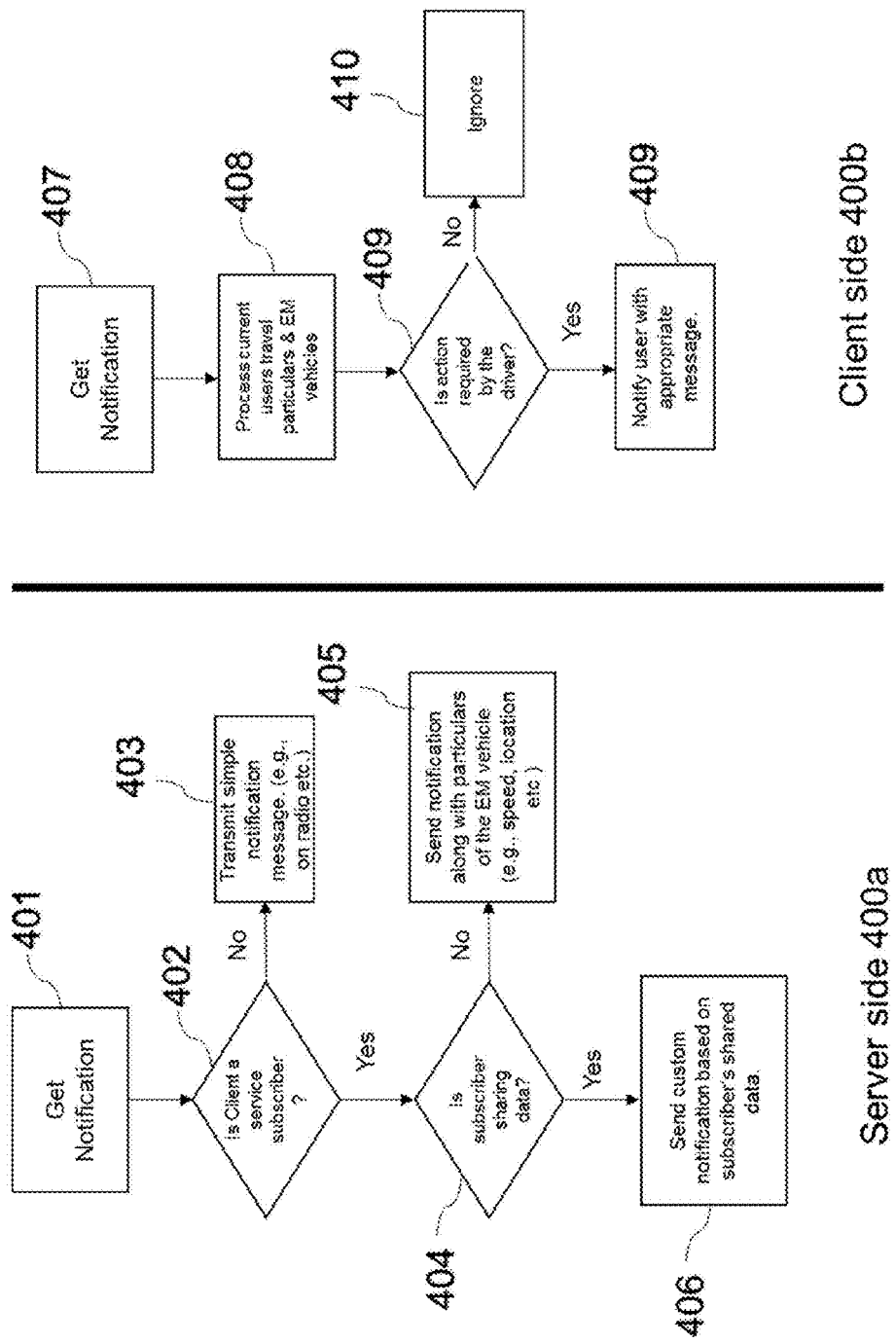
FIG. 4 exemplarily shows sending of custom and generic notification using a client side application 400b and a server side application 400a to maximize server side processing and limit client side processing.

With reference now to FIG. 1, the emergency vehicle route management method 100 includes various steps to provide users with instructions on how to act to according to a path of the emergency vehicle. As shown in at least FIG. 2, one or more computers of a computer system 12 can include a memory 28 having instructions stored in a storage system to perform the steps of FIG. 1. With reference to FIG. 4, the emergency vehicle route management method 400 can send custom and generic notification using a client side application 400b and a server side application 400a to maximize server side processing and limit client side processing. Also, with reference to FIG. 5, the emergency vehicle route management method 500 can send custom and generic notification using a client side application 500b and a server side application 500a to maximize client side processing and limit server side processing.

With the use of these various steps and instructions, the emergency vehicle route management methods 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Figure 6:
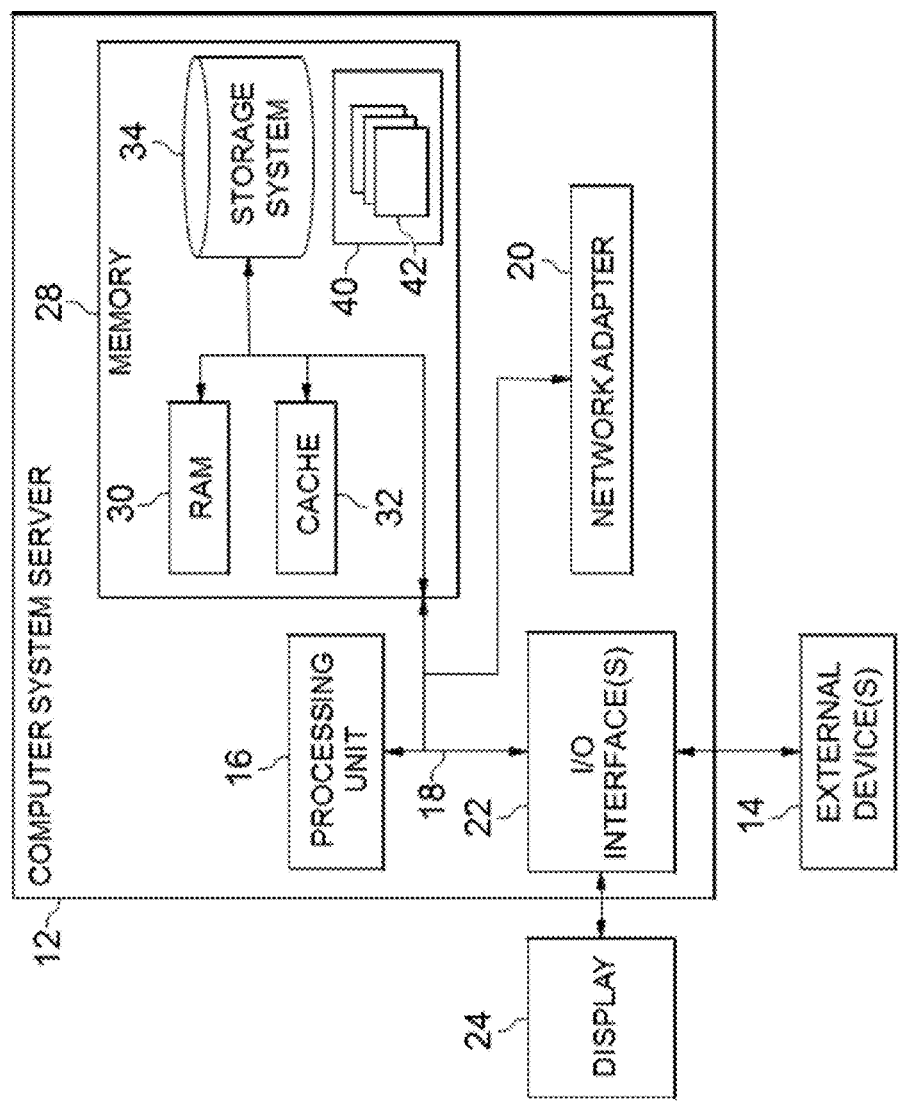
FIG. 6 depicts a cloud computing node according to an embodiment of the present invention.
Figure 7:
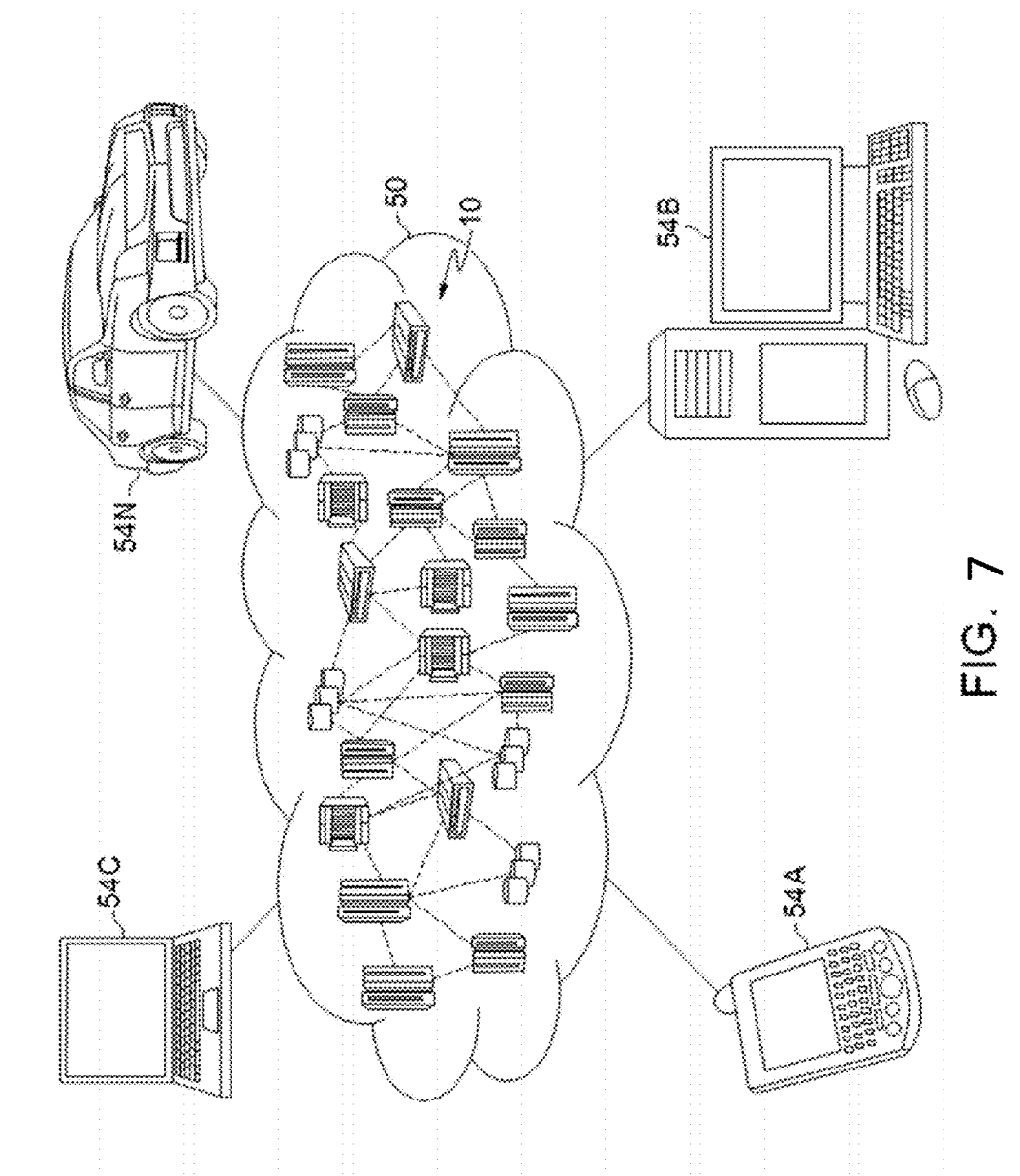
FIG. 7 depicts a cloud computing environment according to another embodiment of the present invention.
Figure 8:
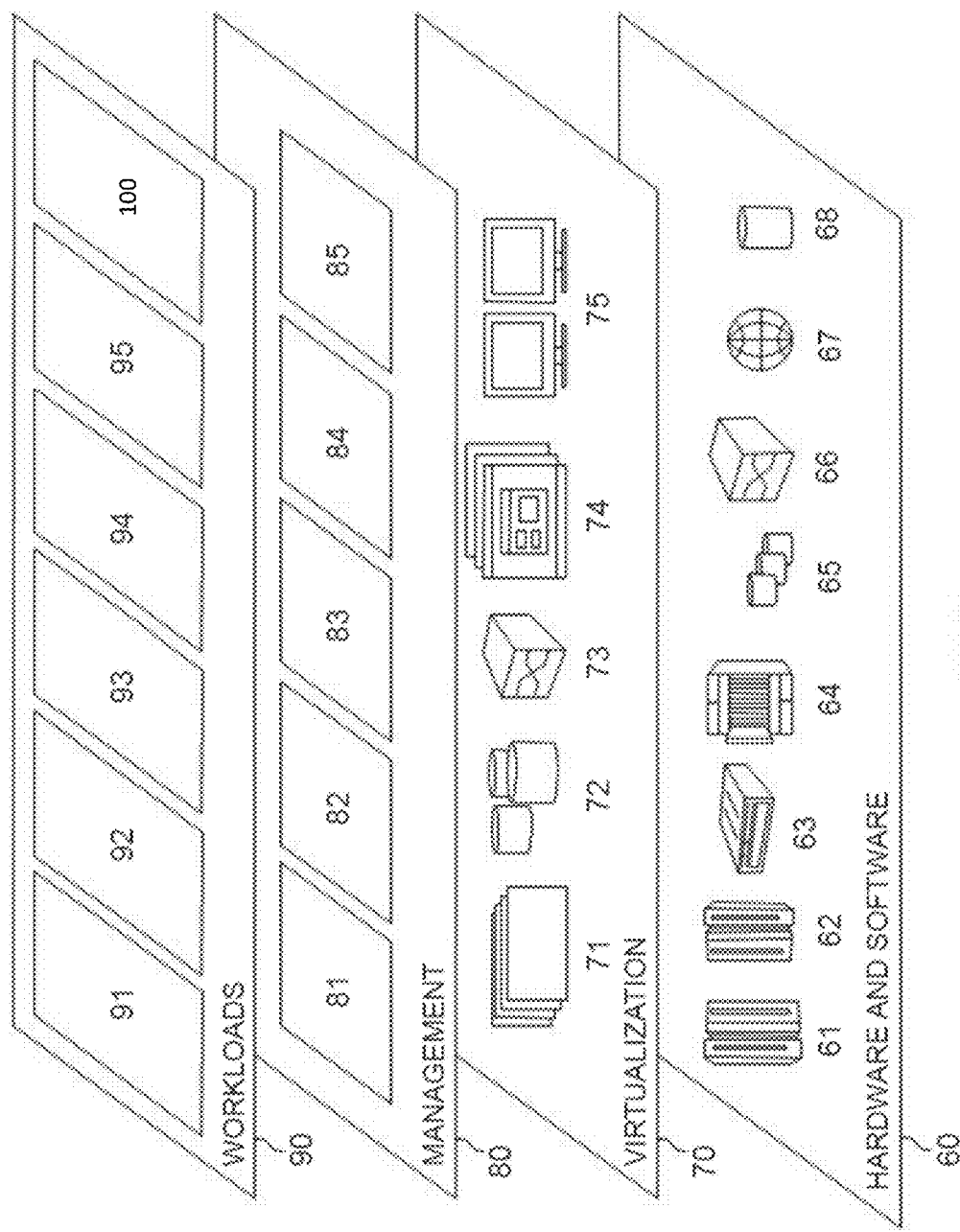
FIG. 8 depicts abstraction model layers according to an embodiment of the present invention.

Although as shown in FIGS. 6-8 and as described later, the computer system/server 12 is exemplarily shown in cloud computing node 10 as a general-purpose computing circuit which may execute in a layer the emergency vehicle route management system method (FIG. 8), it is noted that the present invention can be implemented outside of the cloud environment.

In step 100, the emergency vehicle starts the method 100 by either triggering its state of emergency or automatically triggered by turning the siren on.

Figure 3:
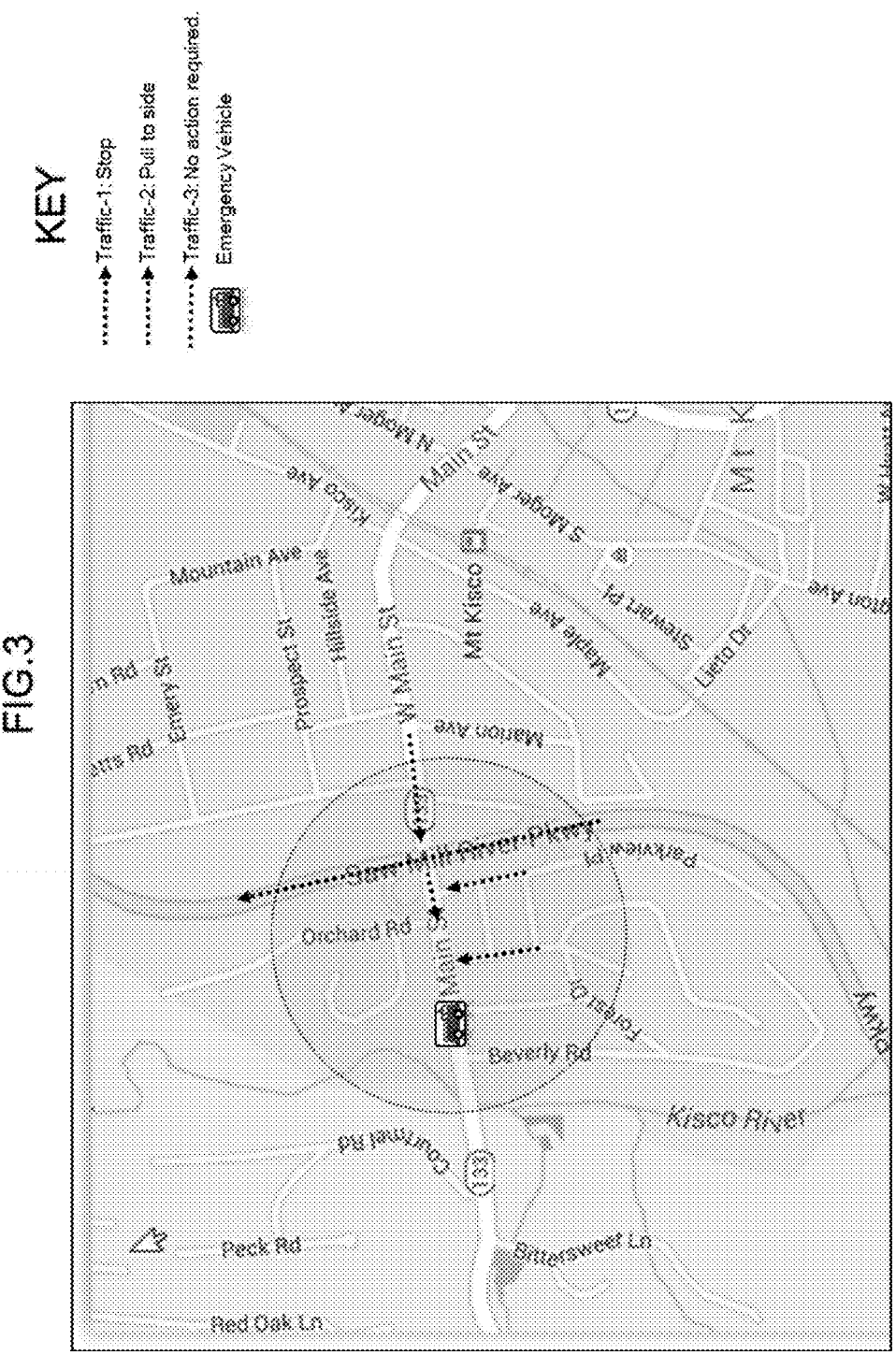
FIG. 3 exemplarily shows an analyzed map and actions for the users by the emergency vehicle route management method 100.

Step 101 analyzes the map and plots a user including user data on the map. The user can comprise a user vehicle, a traffic signal, a pedestrian, other emergency vehicles, etc. The user data includes, for example, a vector heading of the user (e.g., speed and direction) and a location of the user such as the road that the user is on. For example, a user vehicle can be plotted to include the current road that the user is on, the speed of the user vehicle, and travel direction of the user vehicle. Also, Step 101 analyzes the map and plots the emergency vehicle including the location, speed, and relative direction of the emergency vehicle. Alternatively, Step 101 can receive a destination of the emergency vehicle based on an emergency call or input by the emergency vehicle. For example, as shown in FIG. 3, Step 101 plots the emergency vehicle on W. Main St heading towards the overpass of Saw Mill River Pkwy.

Step 102 determines the intersection of the roads (or travel paths) within a predetermined radius of the emergency vehicle. For example, as shown in FIG. 3, Step 102 determines that W. Main St. and Saw Mill River Pkwy do not intersect because Saw Mill River Pkwy has an overpass over W. Main St. However, Step 102 determines that Parkview Place intersects with W. Main St. Further, because Maple Ave is not within the predetermined radius of the emergency vehicle, Step 102 does not determine if Maple Ave intersects with W. Main St. The predetermined radius can vary based on a speed of the emergency vehicle such that there is a larger radius the faster that the vehicle is traveling. Or, the predetermined radius can be small enough to only effect one side of a street in the situation of a lane closing. Step 102 loops until all roads in the predetermined radius are mapped and the intersections are determined.

Based on the plotted path of the emergency vehicle of Step 101 and the intersection of roads of Step 102, Step 103 determines what roads will intersect with the path of the emergency vehicle such that action need to occur.

As shown in FIG. 3, Saw Mill River Pkwy is an overpass and does not intersect with W. Main St thus "NO" is determined in Step 103 and Step 105 ignores the users on Saw Mill River Pkwy (e.g., no action).

Step 104 determines an action for the user to take on the road based on the intersection of the path of the emergency vehicle and road that the user is plotted on.

For example, as shown in FIG. 3, Step 104 determines a "stop" action for users on Parkview P1 because the Parkview place intersects with the path of the emergency vehicle. Also, the user can be a traffic signal that can turn "red" (stop traffic) based on the emergency vehicle approaching the intersection. Also, Step 103 determines that users on W. Main St. intersect with the path of the vehicle such that Step 104 determines an action of "pull to the side" to clear a path for the emergency vehicle to be sent to the user. Or, Step 104 can determine that the traffic signals should change to "orange" (caution) or flashing yellow, etc. to indicate that users should slow down.

Step 104 decides the action for the vehicle to take by determining the location of the intersecting road in Step 104a and determining if the road shares a space (e.g., road, space to interfere the emergency vehicle getting to destination) with the user of the intersecting road in Step 104b. If the user shares a space with the emergency vehicle, Step 104c decides the action to be "pull to side" (e.g., or similarly changing a traffic signal) notification in Step 104c. Step 104d determines if the user or road is behind a location of the emergency vehicle (e.g., the vector plotted for the user and emergency vehicle are in different locations with different heading directions on the road) and if "YES", Step 104e ignores sending the user an action that is behind (e.g., not interfering with) the path of the emergency vehicle.

If the user path is not behind the emergency vehicle as determined by Step 104d, Step 104f generated a "Stop" notification (or the like to a traffic signal) for the user to take.

Thereby, Steps 104a to 104f cause users whose road shares a space with the emergency vehicle (e.g., the emergency vehicle and the user are on the same road) to "pull to the side" such that the emergency vehicle can easily navigate on the current path as well as determining a "stop" action when the user is on a path that will intersect with the emergency vehicle.

It is noted that although the actions are sent to users within the predetermined radius, the method 100 can be configured to include a second predetermined radius larger than the first in which all users in the second predetermined radius receive an alert of the presence of the emergency vehicle and when the user is within the first predetermined radius an action can be determined Users can thus take their own actions to avoid the path of the emergency vehicle such that less users need to take actions as instructed by Step 104.

Alternatively, the predetermined radius can include a geofence of the emergency vehicle and geofences of the user such that the method 100 determines an action when the geofence of the emergency vehicle and the user overlap. That is, Step 104 can send custom actions to the vehicles within its geofence. The method 100 can partition the geofence surrounding the emergency vehicle to functional road segments based on their location and direction of traffic, so that users in each segment receive a notification specifically tailored to avoid interaction with the emergency vehicle. The geofence can be directional (e.g., such as pie slice-shaped), e.g. only notifying road users ahead of the approaching emergency vehicle.

Thus, the method 100 can optimize communication between emergency vehicles and other road users, as well as traffic control systems. Also, the method 100 can be used to clear the path of an emergency vehicle by notifying other road users of its approach and providing directions how to act. The method 100 can allow a stationary emergency vehicle to communicate the presence of hazards on the road or to divert users from approaching a closed road. The method 100 can also optimize communication between an emergency vehicle and traffic control systems to give priority to the vehicle when crossing junctions (e.g. by controlling traffic lights) and minimizing disruption to normal traffic by helping clear congestion caused by the emergency vehicle once the vehicle has passed. Further, the method 100 can analyze the state of the traffic network as a whole and transmits the specific notification to other vehicles within the configurable proximity en-route to the destination of the emergency vehicle on what actions to take. The message communicated may vary depending on the location of the other vehicles.

As the position of the emergency vehicle changes as analyzed in Step 101, the method checks for new roads (e.g., continuous loop of the method).

In one embodiment, the method 100 connects with the traffic system, and triggers its action. Such traffic systems are editable road signs, and traffic lights. The method 100 can use any communication system for communicating between the emergency vehicle and said road signs—radio, text messages, etc.

FIG. 4 exemplarily depicts sending custom and generic notification's (actions) with server side processing the request with minimal client side processing.

Step 401 receives a notification that the user is within the predetermined radius of the emergency vehicle.

Step 402 determines if the user is a subscriber to a service provided by the server (e.g., an emergency vehicle management). If "NO", Step 403 transmits a simple message to the users within the predetermined radius such as a radio message via a radio frequency or the like.

If "YES", Step 404 determines if the user is providing the user data (e.g., the location, path, speed of the user) and if "NO", Step 405 sends a notification to the user including the emergency vehicle data. That is, if the user is not subscribing to the server (e.g., an application or the like), the server side 400*a* via Step 405 sends a notification to the user with the emergency vehicle data such that the user can process the data themselves or make an adjustment accordingly.

If the user is subscribed to the service, the server side 400*a* processes the user data and the emergency vehicle data and sends a custom notification to the user based on the shared user data via Step 406. That is, the server side 400*a* process the majority of the information to provide the user with the action for the user to take such that the user device does not require large processing capabilities.

That is, Step 407 receives the notification of the emergency vehicle being in the predetermined radius of the user. Step 408 processes the current user data and the emergency vehicle data. Based on Step 406 determining an action, Step 409 determines if action is required by the user and Step 409 sends the notification (e.g., action) of Step 406 to the user.

Or, Step 410 would ignore the emergency vehicle. Thus, as shown in FIG. 4, there is minimal client side processing.

Figure 5:
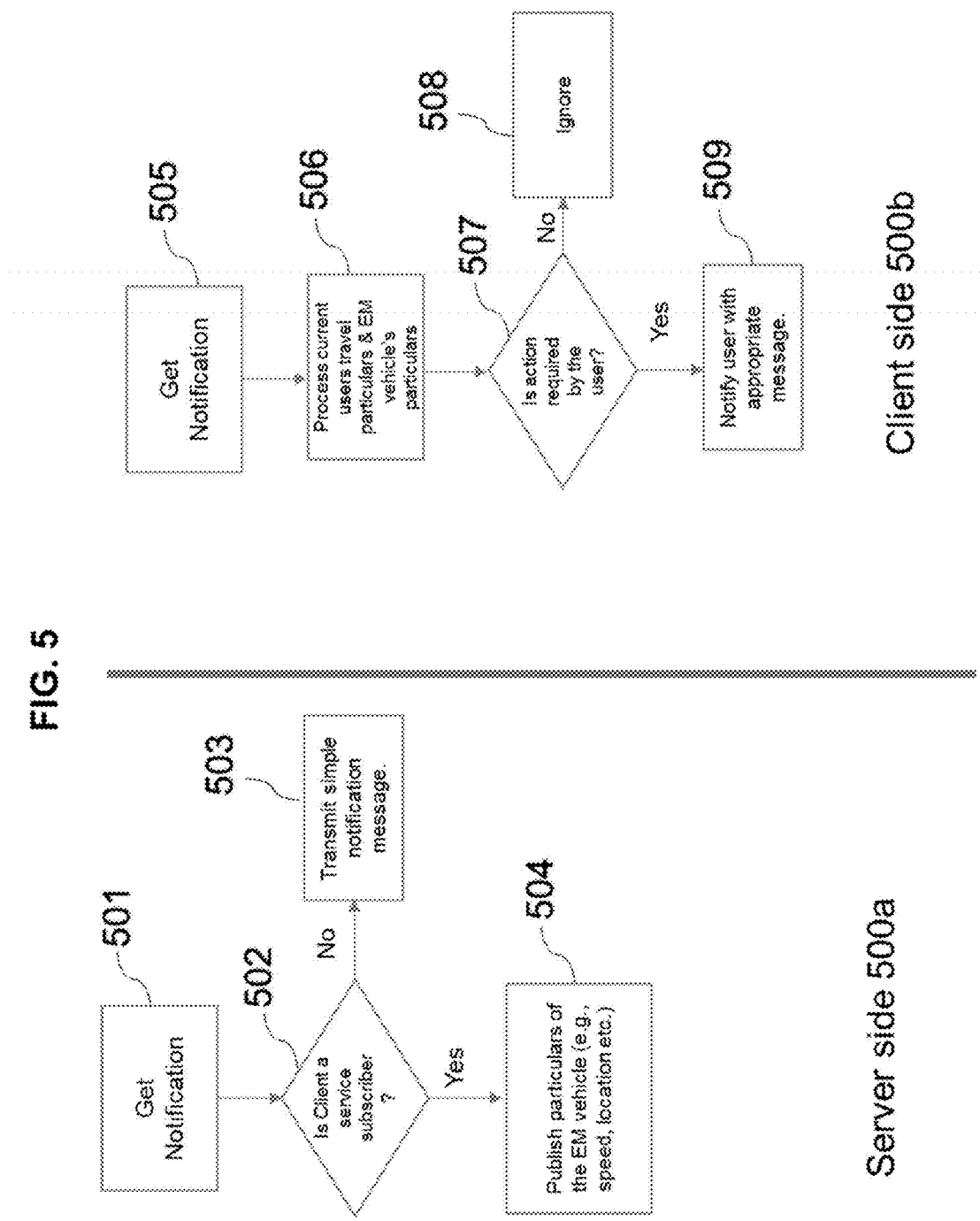
FIG. 5 exemplarily shows sending custom and generic notification using a client side application 500b and a server side server 500a to maximize client side processing and limit server side processing

FIG. 5 exemplarily depicts sending custom and generic notification's (actions) with server side processing the request with maximum client side processing.

Step 501 receives a notification that the emergency vehicle is in an emergency mode.

Step 502 determines if the client is a subscriber to the service (server). If "NO", Step 503 sends a simple notification message to the clients in the area such as "Emergency Vehicle Present".

If "YES", Step 504 distributes the emergency vehicle data to each of the subscribing clients.

On a client side 500*b*, Step 505 receives the emergency vehicle data.

Step 506 processes the current user data (e.g., location, speed, direction) with the received emergency vehicle data such that Step 507 determines if an action is required for the user.

If "NO", Step 508 ignores the emergency vehicle.

If "YES", Step 509 determines the action required for the user. That is, the action determination is done entirely on the client side 500*b*. Also, the server side 500*a* never receives user data to increase privacy of the user and limit the processing requirements on the server side 500*a*. Thus, as shown in FIG. 5, there is maximum client side processing.

Thereby, the emergency vehicle is continuously broadcasting its location, direction and speed. This information can be received and analyzed by applications installed on vehicles, mobile devices and cloud services to display this information on maps and navigation aids and interpret the implication for that specific user. Centralized traffic control systems can reprogram traffic lights to decongest road segments through which the emergency vehicle has to pass and allow the emergency vehicle to go smoothly to its destination. Once the emergency vehicle has passed, measures can be taken to compensate for any congestion caused by the passing of the emergency vehicle.

Thus, the method 100 can facilitate communication between an emergency vehicle and other participants in traffic such that the method 100 can communicate a position, direction and route and speed to the geofence of the emergency vehicle, participants (e.g., users), receive the information, determine the relevance of the message on each participant, and generate the custom instruction by communicating the custom instruction to each user.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 6, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 7, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 7 are intended to be illustrative only and that computing nodes 10 and cloud computing environment 50 can communicate with any type of computerized circuit over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include—mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the anti-counterfeiting system 100 and the anti-counterfeiting system 600 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. An emergency vehicle route management method executed by a processor having a memory storing instructions for the execution, the method comprising:
    analyzing, via the processor, a map to plot roads, a user including user data, and an emergency vehicle including emergency vehicle data on the map;
    determining, via the processor, an intersection of the roads within a predetermined radius of the emergency vehicle; and
    delivering, via the processor, an action for the user based on a road on a path of the emergency vehicle being determined by the determining to intersect with a road of the user,
    wherein the delivering delivers the action to the user when a geofence of a user device overlaps with a geofence of the emergency vehicle,
    wherein the delivering ignores sending the action for the user if a forward traveling side of the geofence of the user overlaps with a portion of the geofence of the emergency vehicle behind the emergency vehicle, and
    wherein the delivering delivers a second action to a traffic grid system on the road in the path of the emergency vehicle such that the traffic grid system changes a flow of traffic to prevent obstruction of the path of the emergency vehicle, the traffic grid system being configured to receive the second action when a portion of the geofence of the emergency vehicle in front of the emergency vehicle is within a predetermined distance of an element of the traffic grid system.

2. The method of claim 1, wherein the user comprises:
    a user vehicle;
    a user in the user vehicle;
    a traffic signal; and
    a pedestrian.

3. The method of claim 1, wherein the emergency vehicle data includes at least one of:
    a road location on the map;
    a direction of travel; and
    a travel speed.

4. The method of claim 1, wherein the user data includes at least one of:
    a road location on the map;
    a direction of travel; and
    a travel speed.

5. The method of claim 1, wherein the emergency vehicle data includes a destination of the emergency vehicle, and
    wherein the analyzing analyzes the map to determine a route of roads on which the emergency vehicle will travel to the destination.

6. The method of claim 1, wherein the delivering delivers a notification including the emergency vehicle data to all users within a second predetermined radius of the emergency, the second predetermined radius being larger than the predetermined radius.

7. The method of claim 1, wherein the delivering delivers the action for the user to take based on the intersection of the path of the emergency vehicle and a path of the user.

8. The method of claim 1, wherein if the user is on a same road as the emergency vehicle and a direction of a path of the user intersects with a direction of a path of the emergency vehicle, the delivering delivers a "pull to a side of the road" notification as the action.

9. The method of claim 1, wherein if the user is on a different road as the emergency vehicle and a direction of a path of the user on the different road intersects with a direction of a path of the emergency vehicle, the delivering delivers a "stop travel" notification as the action.

10. The method of claim 1, wherein if the user shares a travel space with the emergency vehicle, the delivering delivers a "pull to a side of the road" notification as the action.

11. An emergency vehicle route management method executed by a processor having a memory storing instructions for the execution, the method comprising:
    delivering, via the processor, emergency vehicle data of an emergency vehicle to a user device;
    analyzing, via the processor, a map to plot roads and a user including user data on the map;
    determining an intersection of a road on a path of the user with a path of the emergency vehicle; and
    determining, via the processor, an action for the user to avoid interfering with the path of the emergency vehicle,
    wherein the delivering delivers the action to the user device when a geofence of the user device overlaps with a geofence of the emergency vehicle,
    wherein the delivering ignores sending the action for the user device if a forward traveling side of the geofence of the user device overlaps with a portion of the geofence of the emergency vehicle behind the emergency vehicle, and
    wherein the delivering delivers a second action to a traffic grid system on the road in the path of the emergency vehicle such that the traffic grid system changes a flow of traffic to prevent obstruction of the path of the emergency vehicle, the traffic grid system being configured to receive the second action when a portion of the geofence of the emergency vehicle in front of the emergency vehicle is within a predetermined distance of an element of the traffic grid system.

12. A non-transitory computer-readable recording medium recording an emergency vehicle route management program performing the method of claim 1.

13. An emergency vehicle route management system, said system comprising:
    a processor; and
    a memory, the memory storing instructions to cause the processor to perform:
        analyzing a map to plot roads, a user including user data, and an emergency vehicle including emergency vehicle data on the map;
        determining an intersection of the roads within a predetermined radius of the emergency vehicle; and
        delivering an action for the user based on a road on a path of the emergency vehicle being determined by the determining to intersect with a road of the user,
    wherein the delivering delivers the action to the user when a geofence of a user device overlaps with a geofence of the emergency vehicle,
    wherein the delivering ignores sending the action for the user if a forward traveling side of the geofence of the user device overlaps with a portion of the geofence of the emergency vehicle behind the emergency vehicle, wherein the delivering delivers a second action to a traffic grid system on the road in the path of the emergency vehicle such that the traffic grid system changes a flow of traffic to prevent obstruction of the path of the emergency vehicle, the traffic grid system being configured to receive the second action when a portion of the geofence of the emergency vehicle in front of the emergency vehicle is within a predetermined distance of an element of the traffic grid system.

14. The system of claim 13, wherein the delivering delivers a notification including the emergency vehicle data to all users within a second predetermined radius of the emergency, the second predetermined radius being larger than the predetermined radius.

15. The system of claim 13, wherein the delivering delivers the action for the user to take based on the intersection of the path of the emergency vehicle and a path of the user.

16. The system of claim 13, wherein if the user is on a same road as the emergency vehicle and a direction of a path of the user intersects with a direction of a path of the emergency vehicle, the delivering delivers a "pull to a side of the road" notification as the action.

17. The system of claim 13, wherein if the user is on a different road as the emergency vehicle and a direction of a path of the user on the different road intersects with a direction of a path of the emergency vehicle, the delivering delivers a "stop travel" notification as the action.

18. The system of claim 13, wherein if the user shares a travel space with the emergency vehicle, the delivering delivers a "pull to a side of the road" notification as the action.

* * * * *